United States Patent
Laugen (10) Patent No.: US 6,536,462 B1
(45) Date of Patent: Mar. 25, 2003

(54) FIRE HYDRANT COVER

(76) Inventor: David G. Laugen, 5759 S. Wright St., Kingsville, OH (US) 44048

( * ) Notice: Subject to any disclaimer, the term of this patent is extended or adjusted under 35 U.S.C. 154(b) by 0 days.

(21) Appl. No.: 10/173,351

(22) Filed: Jun. 17, 2002

(51) Int. Cl.[7] ............................. E03B 9/06; F16K 27/06; F16K 27/12
(52) U.S. Cl. ......................... 137/296; 137/364; 137/371; 137/382; 137/15.17; 137/15.18; 220/724
(58) Field of Search .................................. 137/294, 295, 137/296, 364, 371, 377, 382, 15.17, 15.18; 220/345.1, 350, 724, 780

(56) References Cited

U.S. PATENT DOCUMENTS

| | | | |
|---|---|---|---|
| 565,013 A | | 8/1896 | Moodie |
| 926,027 A | * | 6/1909 | Smith .......................... 137/296 |
| 1,105,040 A | * | 7/1914 | Paulus ......................... 137/296 |
| 2,869,576 A | * | 1/1959 | Kennedy ..................... 137/296 |
| 4,021,131 A | * | 5/1977 | Bakken et al. .............. 220/484 |
| 4,182,361 A | | 1/1980 | Oakley |
| 4,398,556 A | | 8/1983 | Pereira et al. |
| 4,556,080 A | * | 12/1985 | Picaud ........................ 137/296 |
| 4,616,763 A | * | 10/1986 | Ruhl ........................... 220/724 |
| 4,736,765 A | | 4/1988 | Campbell |
| 4,908,249 A | | 3/1990 | Lines |
| 5,664,597 A | | 9/1997 | Miskiweicz |
| 5,899,222 A | * | 5/1999 | Gencarelli ................... 137/294 |

* cited by examiner

Primary Examiner—George L. Walton
(74) Attorney, Agent, or Firm—Robert R. Hussey Co. LPA (57) ABSTRACT

A cover is provided for selectively covering and uncovering a fire hydrant or the like so that the hydrant is protected and easily located and maintained. The cover has an upper cover portion formed to enclose the fire hydrant when positioned over the fire hydrant. The upper cover portion has a bottom portion terminating in a bottom perimeter. The cover also a cover securing portion adapted to be removably attachable to the fire hydrant. The cover securing portion has an outer peripheral portion adjacent the bottom of the upper cover portion and plurality of flexible securing tabs. The flexible securing tabs extend inwardly from the outer peripheral portion to a tab securing surface which contacts the fire hydrant when the cover is positioned over the fire hydrant and secures the cover to the fire hydrant.

23 Claims, 7 Drawing Sheets

FIRE HYDRANT COVER

BACKGROUND OF THE INVENTION

The present invention relates in general to a cover for selectively covering and uncovering an article and more particularly to a cover for selectively covering and uncovering a fire hydrant or the like.

As is known, fire hydrants are used for supplying water for fighting a fire. Such hydrants are located generally beside a roadway. Firefighters transport themselves to the location of a fire, connect a pumper truck to water supplied by the fire hydrant and pressurize the water. A hose is connected to the pumper truck and conducts the pressurized water to the fire.

As is known, time is of the essence when fighting a fire. When firefighters reach a fire, it is important to be able to quickly locate the fire hydrant to supply the pumper truck with water. Various conditions may exist that make it difficult to locate the fire hydrant. For example, in the winter a substantial snowfall may make it difficult to locate hydrant. When a fire hydrant is located beside a roadway, plows pass along the roadway moving snow to the roadside and in some cases, further obscuring the fire hydrant from plain view. Accordingly, it is desirable to provide for ready location of a fire hydrant when the firefighters arrived at the scene of a fire.

In addition, such substantial snowfalls make it difficult to access the fire hydrant and allow the firefighter to connect the pumper truck to the fire hydrant. In some cases, snow removal road crews also remove the snow from around the fire hydrants. Accordingly, it is also desirable to avoid such additional cost in requiring the removal of snow from around the fire hydrant.

It is also important that a fire hydrant be operable when the firefighters arrive at the scene of fire. Fire hydrants may be rendered inoperable by frozen water which makes it difficult to connect the hydrant to the pumper truck or alternatively to actuate the valve on the hydrant. This requires the firefighters to overcome the problems created by the frozen water and losing valuable time in fighting the fire. Fire hydrants may also be rendered inoperable by vandals tampering with and damaging the fire hydrant. Accordingly, it is desirable to protect a fire hydrant from the elements and vandalism.

In addition, fire hydrants require periodic maintenance by cleaning and maintaining them to avoid rusting of various components. As is known, unmaintained fire hydrants may be inoperative creating great difficulty for the firefighters. Maintenance service also requires painting the fire hydrant. Such repeated maintenance of the fire hydrant significantly increases the cost of operating fire hydrants. Accordingly, it is desirable to avoid repeated maintenance of cleaning and painting the fire hydrant.

One known approach to locating a fire hydrant is by the attachment of a pole to the hydrant, as shown in Lines U.S. Pat. No. 4,908,249. The pole extends well above the fire hydrant to provide for locating the fire hydrant.

Another known device is disclosed in Miskiewicz, U.S. Pat. No. 5,664,597, which provides a cover over the fire hydrant and is secured to the fire hydrant with a strap. If access to the fire hydrant is not readily available by removing the strap, the cover is made from rigid material and is capable of easily being shattered by the axe of a firefighter. Designs for initially holding the cover in place before attaching the strap includes sand bags and water weighted rings. Permanently securing the cover to the ground with spikes or nails is also disclosed. A pole is attached to the cover and has a flag attached to the cover and extends above the cover.

When the firefighters reach a fire, it is important to readily gain access to the fire hydrant. Accordingly, it is desirable to provide a fire hydrant cover that may be easily and quickly secured to the fire hydrant and readily removed when the fire hydrant is to be used without damaging the fire hydrant cover.

SUMMARY OF THE INVENTION

The present invention provides the above described desirable features with an improved cover for a fire hydrant or the like. The cover of the present invention is provided for ready location of a fire hydrant when the firefighters arrive at the scene of a fire.

The cover of the present invention provides a novel design for selectively attaching and detaching the cover to a fire hydrant or the like, and allows for the cover to be easily and quickly secured to the fire hydrant without the use of straps and other such separate attachment devices. When it is necessary to use the fire hydrant to provide water to fight a fire, the cover of the present invention may be readily removed from the hydrant without damaging the cover. Since the cover of the present invention may be readily removed, periodic cleaning, maintenance, and painting of the fire hydrant is allowed without damage to the cover. The cover of the present invention also avoids the cost of requiring removal of snow from around the fire hydrant and when the cover is removed provides space for the operation of the hydrant. It should be understood that the cover of the present invention may be used with other articles extending from the ground to provide the beneficial features of the present invention.

The cover of the present invention has an upper cover portion having a top and side portions. The sides extend from the top to a bottom portion which terminates in a bottom perimeter. The upper cover portion is formed to enclose the fire hydrant when positioned over it with the bottom perimeter adjacent the ground from which the fire hydrant extends.

The cover of the present invention also includes a cover securing portion adapted to be removably attachable to the fire hydrant. The cover securing portion has an outer peripheral portion adjacent to the bottom portion of the upper cover. The cover securing portion as flexible securing tabs extending inwardly from the outer peripheral portion of the cover securing portion to a tab securing surface. The tab securing surfaces of the tabs define an aperture for receiving the fire hydrant therethrough.

The fire hydrant has a base having a predetermined circumferential distance. The base of the fire hydrant extends from the ground to a connector portion on the top of the hydrant. As is known, the connector portion has several connectors for attachment to a fire hose, such as by threading the fire hose connector sleeve to a connector, and the connectors generally extend outwardly of the base. The connector portion also generally includes a valve to selectively provide the flow of water through selected fire hydrant connectors and consequently through the fire hose attached thereto and alternatively prohibit the flow of water to selected fire hydrant connectors.

Preferably, the base of the fire hydrant has a circumferential distance greater than the aperture defined by the tab securing surfaces of the tabs. When this condition exists, the flexible securing tabs are at an acute angle to the ground with their tab securing surfaces in contact with the fire hydrant. By so positioning the securing tabs, the cover of the present invention is removably attached to the fire hydrant while allowing ready removal of the cover therefrom.

To attach the cover of the present invention over the fire hydrant, the cover is positioned above the fire hydrant with the aperture in the bottom cover adjacent the top of the fire hydrant. The upper portion of the cover has handles on opposite sides thereof to facilitate the attachment to or removal of the cover from the fire hydrant. As the cover is lowered over the fire hydrant, the flexible securing tabs flex inwardly so that the connector portion of the fire hydrant can be received in the cover. As the securing tabs move over the connector portion of the fire hydrant, the tab securing surfaces thereof are in contact with the connector portion and continue to flex depended on the configuration of the fire hydrant.

When the bottom cover portion moves past the connector portion of the fire hydrant, the tab securing surfaces slide along the base of the fire hydrant until the bottom perimeter of the cover is adjacent the ground. In this position, the flexible securing tabs are at an acute angle with the ground and with the tab securing surfaces contacting the base of the fire hydrant. When a force is exerted on the cover tending to tilt the cover about the base of the fire hydrant, the tab securing surfaces of the securing tabs are in contact with the base of the fire hydrant and resist removal of the cover from the fire hydrant.

To more readily locate the cover and consequentially the fire hydrant, the cover has indentations in the sides of the cover for receiving and protecting reflective strips. The reflective strips allow for quick location of the cover, particularly in the night or other periods of low light levels.

Other desirable features and advantages of the present invention will become apparent from a study of the following description and accompanying drawings which are illustrative of the present invention.

DETAILED DESCRIPTION OF THE INVENTION

Figure 1:
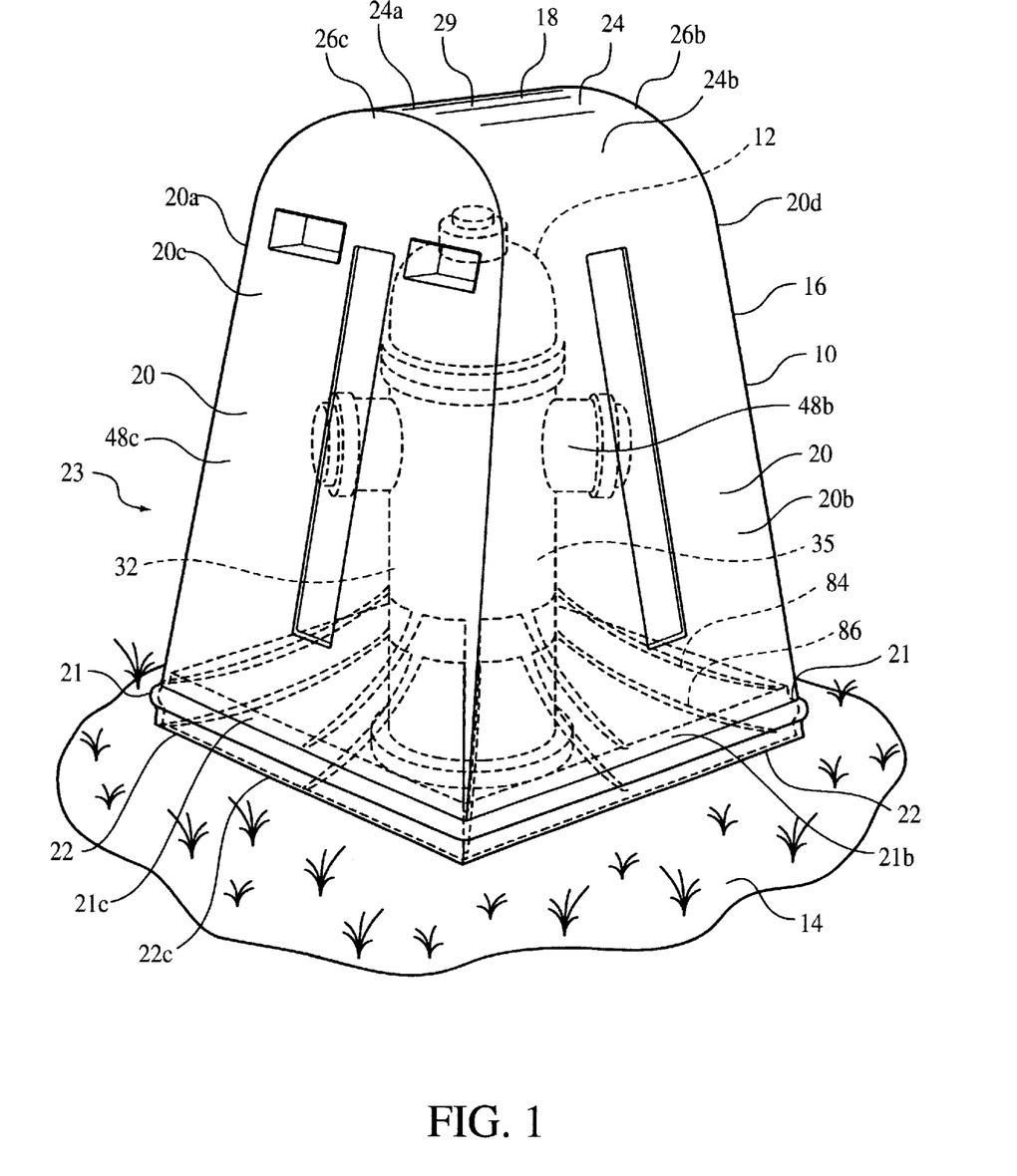
FIG. 1 is a perspective view of a hydrant cover of the present invention removably attached to a fire hydrant and showing the flexible securing tabs contacting the base of the fire hydrant.
Figure 2:
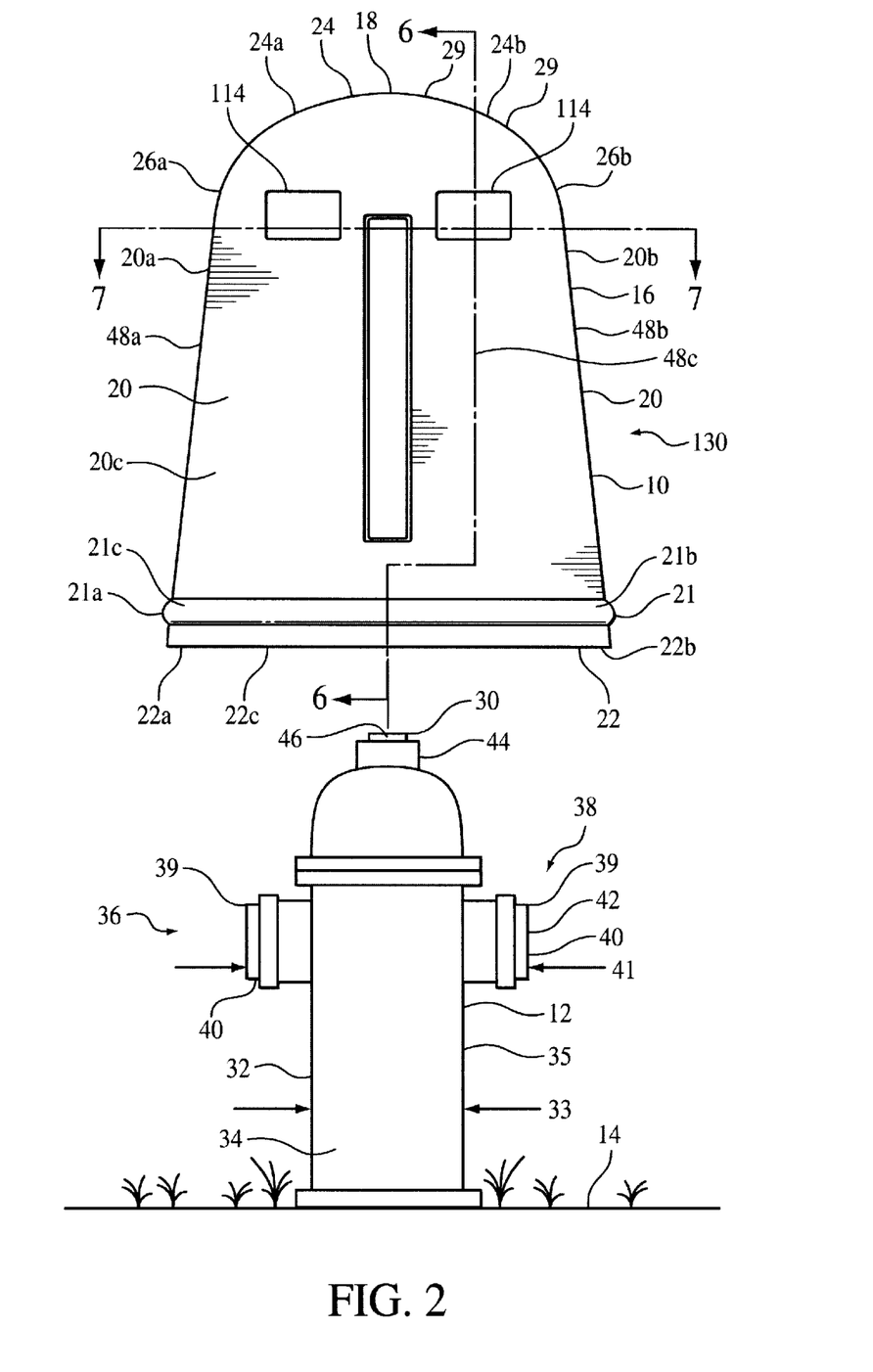
FIG. 2 is a side view of the hydrant cover shown in FIG. 1 positioned above the fire hydrant.

The present invention provides an improved cover 10, as seen in FIGS. 1 and 2, which is removably attachable to a fire hydrant 12 or the like and provides for ready location of the fire hydrant 12 when the firefighters arrive at the scene of a fire. It should be understood that the cover 10 may be used with other articles extending from the ground 14 to provide the beneficial features of the present invention. It should further be understood that the term "fire hydrant" as used herein also includes other devices, such as stand pipes, that extend from the ground 14, and that the term "fire hydrant" is used herein for including such other devices. It should be further understood that the term "ground" as used herein includes any surface that a fire hydrant or the like extends from and that the term "ground" is used for including such surfaces.

The cover 10 of the present invention provides a novel design for selectively attaching and detaching the cover 10 to the fire hydrant 12 or the like and allows for the cover 10 to be easily and quickly secured to the fire hydrant 12 without the use of straps and other such separate attachment devices. The cover 10 of the present invention may be readily removed without damaging the cover 10 when it is necessary to use the fire hydrant 12 to provide water to fight a fire. Since the cover 10 may be readily removed, periodic cleaning, maintenance, and painting of the fire hydrant 12 is allowed without damage to the cover. The cover 10 also avoids the cost of requiring removal of snow from around the fire hydrant 12 since when the cover is removed from the fire hydrant a space is provided for the operation of the hydrant.

The cover 10 has an upper cover portion 16 having a top portion 18 and side portions 20a–20d extending from the top portion to respective bottom portions 21a–21d with all of the bottom portions 21a–21d herein referred to as 21. The bottom portions 21a–21d terminate in their respective bottom perimeters 22a–22d with all of the bottom perimeters 22a–22d wherein referred to as 22. The upper cover portion 16 is formed to enclose the fire hydrant 12 when positioned over it in the covered positioned 23, as shown in FIG. 1, with the bottom perimeter 22 adjacent the ground 14 from which the fire hydrant 12 extends.

The top portion 18 of the cover 10 is formed to allow for the flow of the elements, such as rain, snow, and dirt, off of the top 18, and down the sides 20 to the ground 14. In the embodiment disclosed in FIGS. 1–7, the top 18 has a top curved surface 24 having sides 24a and 24b extending between the opposing sides 20a, 20b respectively and joins the opposing sides at edges 26a and 26b respectively as shown in FIG. 2. The sides 24a, 24b of the curved surface 24 also extend between the opposing sides 20c, 20d and joins the opposing sides 20c, 20d at edges 26c, 26d respectively. The curved surface 24 defines the top crown 29 of the top 18 which is the uppermost portion of the cover 10 of the present invention. The curved surface 24 provides for the flow of the elements contacting the top 18 to flow down the curved surface 24 and subsequently down opposing sides 20a, 20b and 20c, 20d. It should be understood that it is within the contemplation of this invention to provide an upper cover portion 16 of a wide variety of constructions and designs which cover the fire hydrant and preferably allow for the flow of the elements off of the cover. For example, the top 18 could be formed in a conical or multisided pyramid configuration in which the top 18 and sides 20 are contiguous or even in a rectangular or other polygon shape.

The sides 20a–20d extend downwardly from the top 18 a sufficient distance, so that when the cover 10 is positioned over the fire hydrant 12 in the covered positioned 23 with the bottom perimeter 22 of the sides 20 adjacent the ground 14, the top portion 18 is positioned above the top surface 30 of the fire hydrant and the bottom perimeter 22 contacts the ground unimpeded by contact with the fire hydrant. The sides 20a–20d are also spaced from each other a sufficient distance to avoid lateral contact with the fire hydrant 12 when the cover 10 is a mounted over the fire hydrant.

Figure 4:
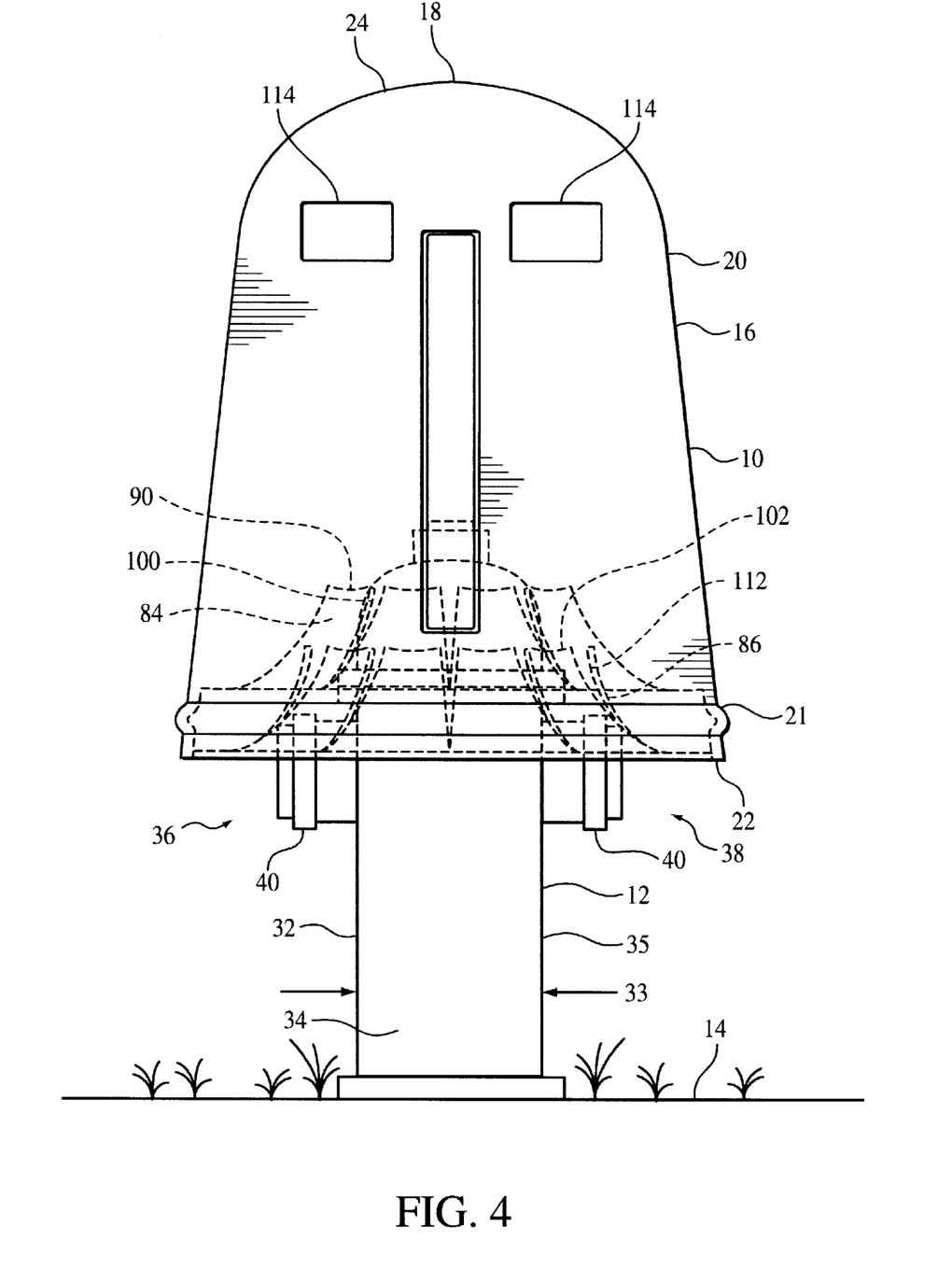
FIG. 4 is a side view of the hydrant cover shown in FIG. 1 positioned around the discharge outlets of the hydrant with the flexible securing tabs deformed so as to allow the cover to be moved over the hydrant.

The fire hydrant 12 as seen in FIGS. 2 and 4, has a base 32 having a predetermined diameter 33 having a circumferential distance 34 their around described by the outer perimeter 35 of the base 32. The base 32 of the fire hydrant 12 extends from the ground 14 to a connector portion 36 on the top 38 of the hydrant. As is known, the connector portion 36 has a pair of connectors 40 which generally extend radially with respect to the base 32 and terminate in connector ends 39. The connectors 40 are provided for attachment to a fire hose (not shown), such as by threading the fire hose connector sleeve to the connector 40 on the fire hydrant 12. The distance 41 between the connector ends 39 is greater than the diameter 33 of the base 32. The circumferential distance 42 of the connector portion 36 is greater than the circumferential distance 34 of the base 32.

The connector portion 36 also generally includes a valve 44 to selectively provide the flow of water through the fire hydrant 12 to the connectors 40 and consequently through the fire hose attached thereto. Alternatively, the valve 44 when in the closed position prohibits the flow of water to the fire hydrant connector 40. In the fire hydrant 12 shown in drawings, the top 46 of the valve 44 defines the top surface 30 of the fire hydrant 12. It should be understood that fire hydrants are of a wide variety of constructions and designs and for example, the predetermined circumferential distances 34, 42, and the number of connectors 40 may vary dependent on the particular fire hydrant. Further, it should be understood that some fire hydrants may not have a circular base 32 and in such a case, the diameter 33 refers to the largest cross distance of the base of that fire hydrant. It is also contemplated that the cover 10 of the present invention may be used with fire hydrants, stand pipes and other such devices of a wide variety of constructions and designs.

The sides 20a–20d are also spaced from each other a sufficient distance to avoid lateral contact with the fire hydrant 12 when the cover 10 is a mounted over the fire hydrant. The opposing sides 20a and 20b have connector end portions 48a and 48b which are adjacent the connector ends 39 when the cover 10 is in the covered positioned 23 and covers the fire hydrant 12 shown in FIG. 1. The connector end portions 48a and 48b are spaced from each other a distance greater than the distance 41 between the connector ends 39. The opposing sides 20c and 20d have connector end portions 48c and 48d respectively. To allow for positioning of the cover 10 in the covered positioned 23 so that the connector end portions 48c and 48d dare adjacent the connector ends 39 when the cover 10 is in the covered positioned, the connector end portions 48c and 48d are spaced from each other a distance greater than the distance 41 between the connector ends 39. By so configuring the sides 20a–20d, the cover 10 can be positioned in the covered positioned 23 with different orientations of the cover 10.

It should be understood that it is within the contemplation of this invention to space one pair of the opposing sides 20, 20b or 20c, 20d closer to each other so the other pair of opposing sides are adjacent the connector ends 39. In such a design, the cover 10 may be positioned in the covered positioned 23 with one orientation. It is also within the contemplation of this invention that there may be different configurations of the connector ends 39, including three or four connectors and that the sides 20a–20d are sized so the cover 10 may be positioned in the covered positioned 23 so as to avoid lateral contact with the fire hydrant 12.

The sides 20a–20d are tapered outwardly as they extend away from the top portion 18 of the upper cover portion 16 and are formed at an acute angle X with respect to the bottom perimeter 22. As is known, an acute angle is an angle that is less than 90 degrees. By so forming the sides 20a–20d, the elements, such as rain, snow, and dirt, more readily flow down the sides 20a–20d. Also by so forming the sides 20, the cover may be more readily placed in the covering positioned 23 and mounting the cover 10 to the fire hydrant 12 is facilitated as will be hereinafter more fully described.

Figure 3:
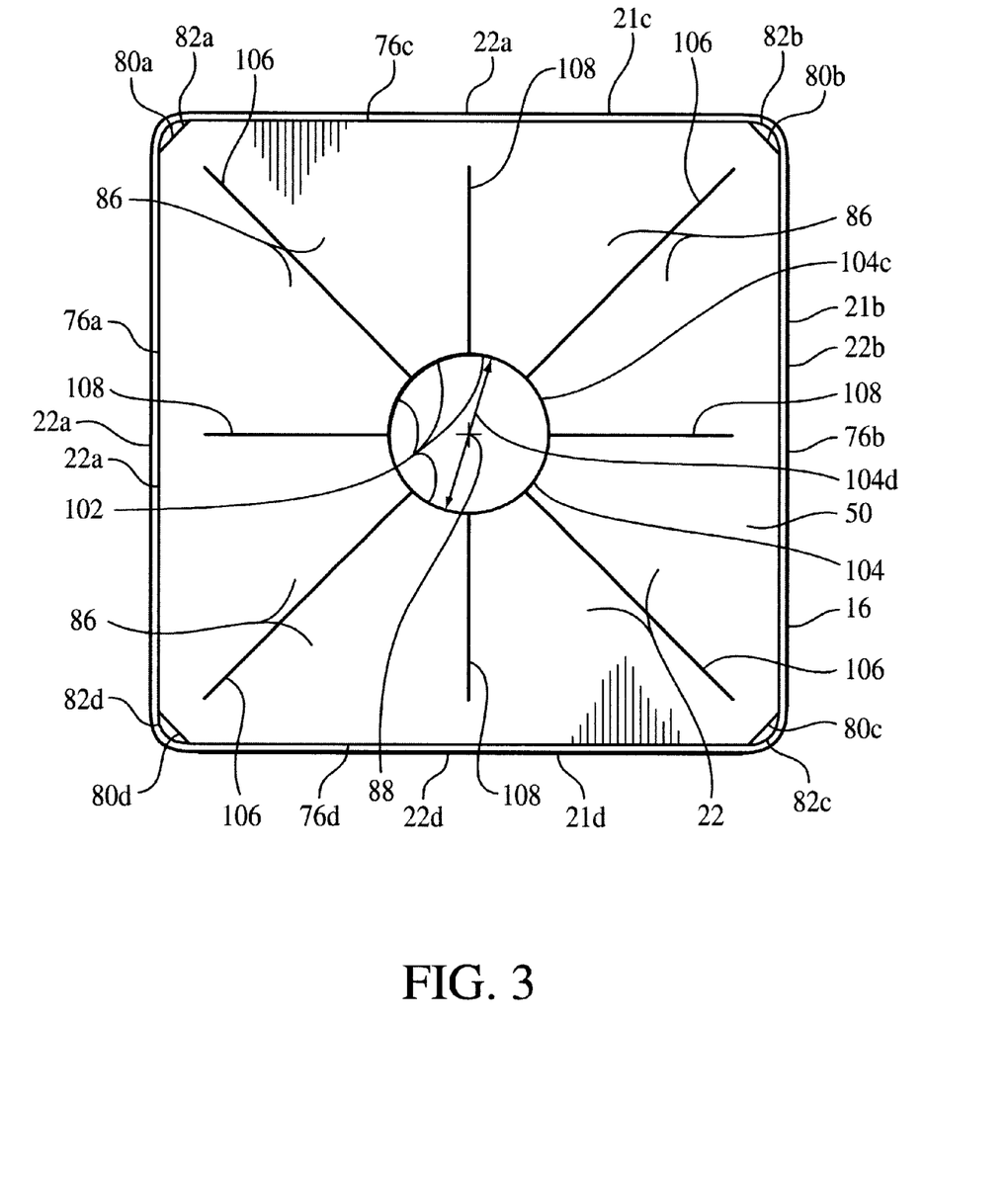
FIG. 3 bottom view of the hydrant cover shown in FIG. 1 showing the flexible securing tabs thereof.
Figure 5:
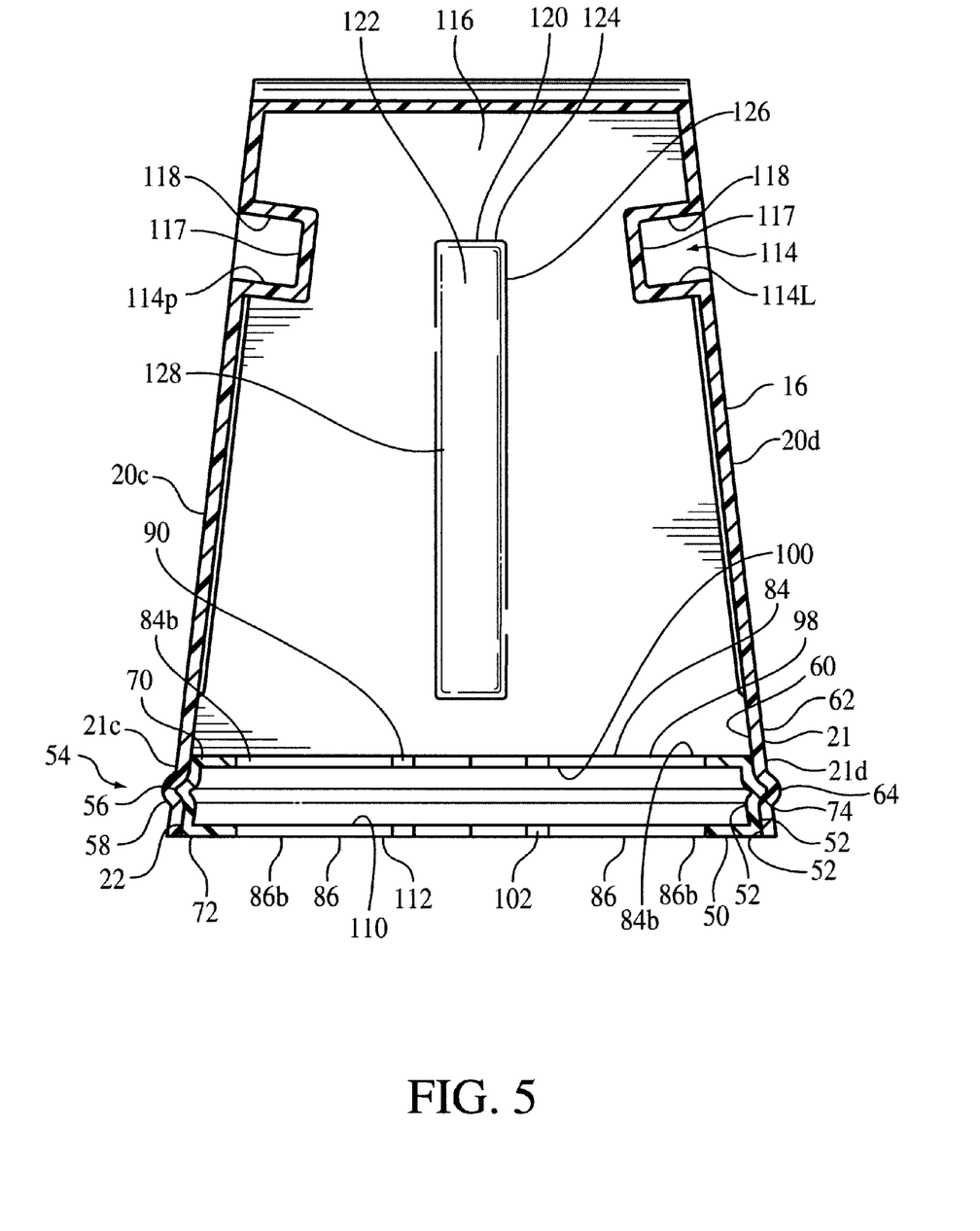
FIG. 5 is a sectional view of the hydrant cover shown in FIG. 2 and taken along line 5—5 thereof.
Figure 6:
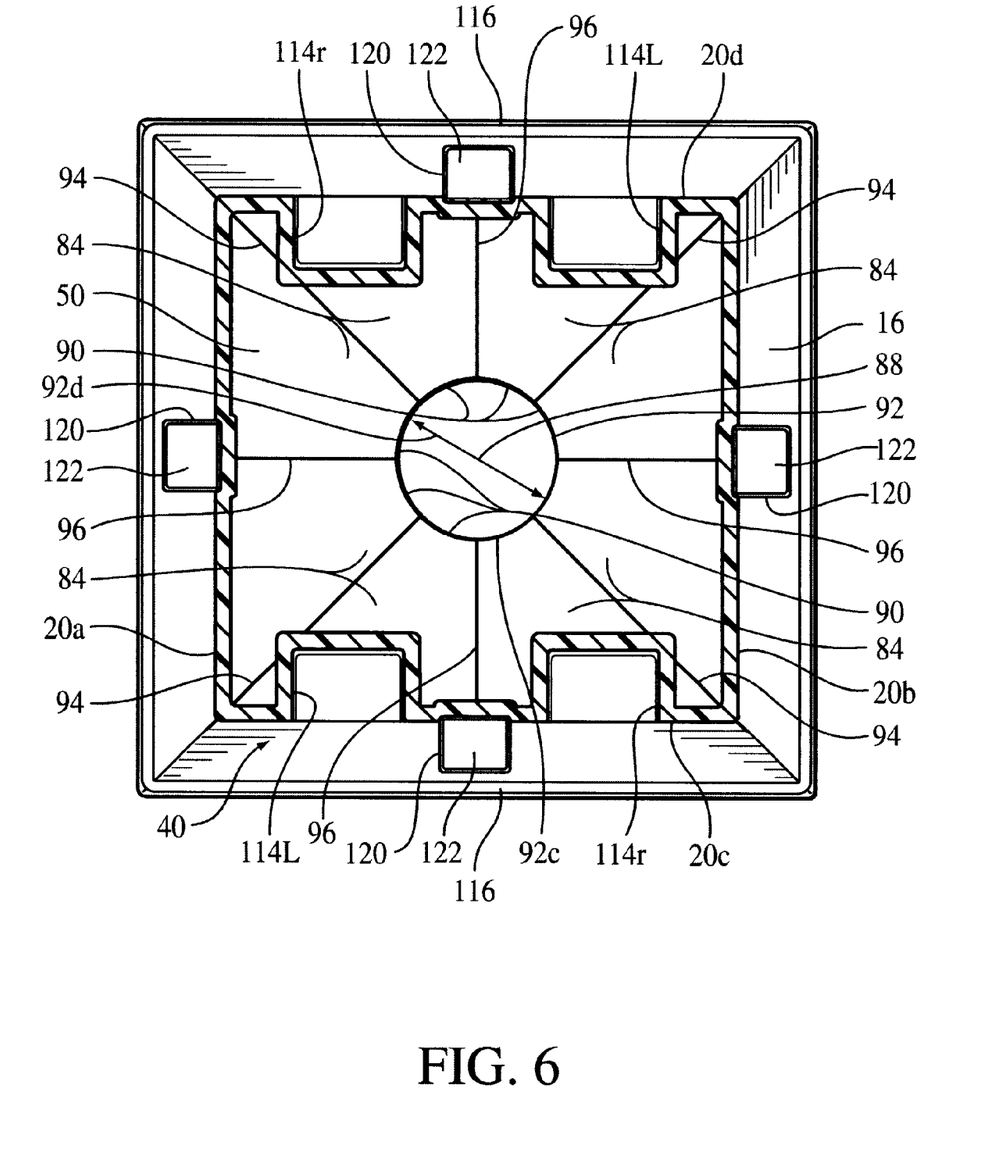
FIG. 6 is a sectional view of the hydrant cover shown in FIG. 2 and taken along line 6—6 thereof.

The cover 10 of the present invention also includes a cover securing portion 50 adapted to be removably attachable to the fire hydrant 12 as seen in FIGS. 3, 5, and 6. The upper cover portion 16 and the cover securing portion 50 are designed to be connected to each other to form the cover 10. The cover securing portion 50 has an outer peripheral portion 52 which is adjacent the bottom portion 21 of the upper cover portion 16 when the cover securing portion 50 is assembled with the upper cover portion. The bottom portion 21 of the upper cover portion 16 has an attachment device 54 for attaching the cover securing portion 50 to the upper cover portion 16.

The attachment device 54 includes a depression 56 in the bottom portion 21 of the upper cover portion 16 and a complementary protrusion 58 in the outer peripheral portion 52 of the cover securing portion 50. The bottom portion 21 has an inner and outer surface 60, 62 respectively which are uniformly spaced from each other so that the bottom portion has a uniform thickness. The depression 56 is formed with a depression surface 64 which extends from the inner surface 60 towards the outer surface 62 and then back to the inner surface 60. The bottom portion 21a–is contiguous with the bottom portion 21c on one side and 21d on the other side. The other side of the bottom portion 21c is contiguous with the bottom portion 21b and the other side of the bottom portion 21d is contiguous with the other side of the bottom portion 21b. Accordingly, the depression 56 extends around a periphery of the bottom 21 of the upper cover portion and is adjacent and spaced above the bottom perimeter 22.

The attachment device 54 also includes a complementary protrusion 58 in the outer peripheral portion 52 of the cover securing portion 50. The outer peripheral portion 52 has an inner and outer surface 66, 68 respectively which are uniformly spaced from each other so that the outer peripheral portion has a uniform thickness. The inner and outer surfaces 66, 68 extend between the upper and lower surfaces 70, 72 of the outer peripheral portion 52. The protrusion 58 is formed with a protrusion surface 74 which extends from the outer surface 68 away from the inner surface 66 and then back to the outer surface 68. The outer surface 68 is formed from four sides 76a–76d which contact the complimentary bottom portions 21a–21d respectively when in an assembled position 78, shown in FIGS. 3, and 5. The sides 76a–76d are connected with corner portions 80a–80d respectively with apertures 82a–82d respectively therebetween to allow for assembly of the cover securing portion 50 to the upper cover portion 16.

To assemble the cover securing portion 50 to the upper cover portion 16, the cover securing portion 50 is oriented to position the sides 76a–76d of the cover securing portion adjacent the bottom perimeter portions 22a–22d respectively. The cover securing portion 50 is then moved toward the upper cover portion 16 and the protrusion 58 on the cover securing portion moves along the inner surface 60 of the bottom portion 21 until the protrusion 58 is received in the depression 56 of the bottom portion 21. The corner portions 80a–80d allow for flexure of the bottom portion 21 and allow the protrusion 58 to be received in the depression 56. In the assembled position 78, the protrusion surface 74 of the protrusion 58 is received by and in contact with the depression surface 64 of the depression 56 to secure the cover securing portion 50 to the upper cover portion 16.

It is within the contemplation of this invention that the attachment device 54 may be of a wide variety of constructions and designs. For example, the attachment device 54 having a tension strap pivotally mounted to either the upper cover portion 16 or the cover securing portion 50 which snaps into contact with the other portion to hold the upper cover 16 and cover securing portion 50 in the assembled position 78 may be used.

Another design for the attachment device 54 includes a series of protruding lips extending from either the upper cover portion 16 or the cover securing portion 50 and received in slots in the other portion 16, 50. Yet another design for the attachment device 54 includes complementary flanges on both the upper cover portion 16 and the cover securing portion 50 which flanges are bolted together. Is also within the contemplation of the present invention to form the upper cover portion 16 integrally with the cover securing portion 50. In such a design the outer peripheral portion 52 is an integral part of the bottom portion 21.

The cover securing portion 50, and consequently the cover 10, is adapted to be removably attached to the fire hydrant 12. To accomplish the removable attachment feature, the cover securing portion 50 of the present invention has upper flexible securing tabs 84 and lower flexible securing tabs 86 extending inwardly from the outer peripheral portion 52 of the cover securing portion 50. The upper and lower tabs 84, 86 are spaced from each other is herein described.

The upper flexible securing tabs 84 extend from the inner surface 66 and the upper surface 70 of the outer peripheral portion 52. The upper tabs 84 extend radially inwardly towards the center 88 of the cover securing portion 50 to the upper tab securing surface 90. The upper tab securing surface 90 is generally arcuate in shape and the upper tab securing surface of all of the upper tabs 84 form an upper aperture 92 about the center 88 of the cover securing portion 50. The upper tabs 84 are separated by diagonal slits 94 extending between the opposing corner portions 80a–80c and 80b–80d and a median slit 96 extending between the center of the side 76a and the center of the side 76b and another median slit 96 extending between the center of the side 76c and the center of the side 76d of the cover securing portion 50. The upper tabs 84 have an upper and lower surface 98, 100 extending between the slits 94, 96 and the upper tab securing surface and outer peripheral portion 52 of the cover securing portion 50. Generally, the upper tabs 84 have a uniform thickness so the distance between the upper and lower surfaces 98,100 is the same.

The lower flexible securing tabs 86 extend from the inner surface 66 and the lower surface 72 of the outer peripheral portion 52 and are spaced from the upper tabs 84. The lower tabs 86 extend radially inwardly towards the center 88 of the cover securing portion 50 to the lower tab securing surface 102. The lower tab securing surface 102 is generally arcuate in shape and the lower tab securing surface of all of the lower tabs 86 form a lower aperture 104 about the center 88 of the cover securing portion 50. The lower tabs 86 are separated by diagonal slits 106 extending between the opposing corner portions 80a–80c and 80b–80d and a median slit 108 extending between the center of the side 76a and the center of the side 76b and another median slit 108 extending between the center of the side 76c and the center of the side 76d of the cover securing portion 50. The lower tabs 86 have an upper and lower surface 110, 112 extending between the slits 106,108 and the lower tab securing surface and outer peripheral portion 52 of the cover securing portion 50. Generally, the lower tabs 86 have a uniform thickness so the distance between the upper and lower surfaces 110, 112 is the same.

The upper and lower flexible securing tabs 84, 86 are formed from a flexible material that allows movement of the tabs when the cover 10 of the present invention is assembled with the fire hydrant 12 as will be hereinafter described. It should be understood that the flexibility of the tabs 84, 86 are also dependent on their thickness, or the distance between the upper and lower surfaces 98, 100 of the upper tabs 84 and the upper and lower surfaces 110,112 of the lower tabs 86. The amount of feature of the tabs 84, 86 must allow the tabs to deform sufficiently to allow the assembly and disassembly of the cover 10 in hydrant 12, yet be sufficiently rigid to hold the cover 10 on the hydrant 12 after assembly there with as will be hereinafter described. It is recognized that is within the contemplation of this invention for the tabs 84, 86 to have different thicknesses or even varying thicknesses to achieve the desired removable attachment of the cover 10 to the hydrant 12.

The embodiment of the present invention shown in FIGS. 1–6 shows upper and lower tabs 84, 86 which have a symmetrical configuration. The base portions 84b, 86b of the securing tabs 84, 86 respectively are adjacent the outer peripheral portion 52 of the cover securing portion 50 and are all equal in length. Likewise the upper and lower tab securing surfaces 90, 102 are also equal in length. The distance between the base portions 84b, 86b and their respective tab securing surfaces 90, 102 are equal. This symmetrical configuration of the upper and lower tabs 84, 86 provides for uniform flexible movement of the upper and lower tabs with equal force exerted on the base 32 of the fire hydrant 12 when the cover is in the covered position 23.

The upper and lower apertures 92, 104 respectively are sized to engage the base 32 of the fire hydrant 12 and hold the cover 10 in position on the fire hydrant when in the covered position 23. The upper and lower apertures 92, 104 have diameters 92d, 104d and define the circumferential distance 92c, 104c. The diameters 92d, 104d are less than one half the diameter 33 of the base 32 of the fire hydrant 12 with the circumferences 92c, 104c correspondingly smaller than the circumferential distance 34 of the base 32. Preferably, the diameters 92d, 104d are less than half of the diameter 33 with the circumferences 92c, 104c correspondingly smaller than the circumferential distance 34 of the base 32. It is within the contemplation of this invention that when more force is required to hold the cover 10 on the hydrant 12, the diameters 92d, 104d may be decreased to xero so the upper and lower apertures 92, 104 are nonexistent and the upper and lower securing tabs 84, 86 grip the fire hydrant with greater force. It is within the contemplation of this invention for the upper and lower apertures 92, 104 to have a wide variety of configurations.

It is within the contemplation of this invention that upper and lower flexible securing tabs 84, 86 of a wide variety of configurations designs and shapes may be used to achieve the beneficial results of the present invention. In fact is described in a another embodiment of this invention shown in FIG. 7, only one set of flexible securing tabs may be provided as will be hereinafter described. In addition it is within the contemplation of this invention to use a greater or lesser number of tabs. The tab securing surfaces 90, 102 may also be of the varying designs and shapes to grip the fire hydrant or stand pipe or the like dependent on the surfaces they are gripping.

To facilitate handling the cover 10, handles 114 are formed in the sides 20c, 20d of the cover. If this can be seen in FIGS. 5 and 6, two handles 114r and to 141l are formed in each of the sides 20c, 20d opposite each other. As will be hereinafter described when moving the cover 10 or from the covered position 23 it is necessary to tilt the cover. By so positioning the handles 114r and 114l on each side of the center 116 of each of the sides 20c, 20d, the operator can hold the diagonal handles 114r and the cover 10 will be balanced. If it is necessary to tilt the cover 10, the operator can hold the handle 114r on one side and 114l on the other side and the cover will tilt. The handles 114 are formed as a cavity 117 having a holding surface 118. The holding surface 118 is provided for the operator to grip the cover 10 and conveniently raise or control the lowering of the cover. Since the handle 114 is formed from the cavity 117 there is no opening through which the elements can enter the inside of the cover 10.

To more readily locate the cover 10 and consequentially the fire hydrant 12, the cover has indentations 120 in the all of the sides 20 of the cover for receiving and protecting reflective strips 122. The reflective strips 122 allow for quick location of the cover 10, particularly in the night or other periods of low light levels. As seen in FIGS. 5 and 6, the indentations 120 extended in a vertical direction along the center 116 of the sides 20a–20d and have a width 124 and length 126 sufficient to receive the reflective strip 122 therein and protect the edges 128 of the reflective strip.

To attach the cover 10 of the present invention over the fire hydrant 12, the cover is positioned a raised uncovered position 130 above the fire hydrant with the center 88 and apertures 92, 104 of the cover securing portion 50 positioned above and adjacent the top 38 of the fire hydrant as shown in FIG. 2. To so position the cover 10 with respect to the fire hydrant 12, the operator grips the handles 114 on opposite sides 20c, 20d. The operator then lowers the cover 10 over the fire hydrant and as the cover is lowered, lower surface 112 of the lower flexible securing tabs 86 contacts the fire hydrant and flex to allow continued lowering of the cover as shown in FIG. 4. As the operator continues to lower the cover the lower surface 100 of the upper flexible securing tabs 84 contacts the fire hydrant and flexes to allow the continued lowering of the cover. As the securing tabs 84, 86 move over the connector portion 36 of the fire hydrant, the tab securing surfaces 90, 102 thereof are in contact with the connector portion as seen in FIG. 4 and continue to flex depended on the configuration of the fire hydrant.

When the cover securing portion moves past the connector portion 36 of the fire hydrant, the tab securing surfaces 90, 102 slide along the outer perimeter 35 of the base 32 of the fire hydrant until the bottom perimeter 22 of the cover 10 is adjacent the ground 14 as shown in FIG. 1. In this position, the flexible securing tabs 84, 86 are at an acute angle with the ground with the tab securing surfaces 90, 102 contacting the outer perimeter 35 of the base 32 of the fire hydrant 12. When a force is exerted on the cover tending to tilt the cover 10 about the base 32 of the fire hydrant, the tab securing surfaces 90, 102 of the securing tabs 84, 86 are in contact with the outer perimeter 35 of the base of the fire hydrant and resist removal of the cover from the fire hydrant. By so positioning the securing tabs 90, 102, the cover 10 of the present invention is removably attached to the fire hydrant 12 while allowing ready removal of the cover therefrom.

In case of a fire or when maintenance is to be performed on the hydrant, it is desirable to remove the cover from the fire hydrant. To remove the cover from the hydrant the operator grips the cover by the handles 114 and raises the cover 10 until the tab securing surfaces 90, 102 contact the connector portion 36 of the fire hydrant. The operator then continues to raise the cover and move the cover between various angular positions to allow the force exerted on the tab securing surfaces 90, 102 to reverse the position of the flexible securing tabs 84, 86 so that the tab securing surfaces 90, 102 are below the bottom perimeter 22 of the cover 10. When the tabs 84, 86 are in this position the operator continues to raise the cover 10 until it is removed from fire hydrant.

Figure 7:
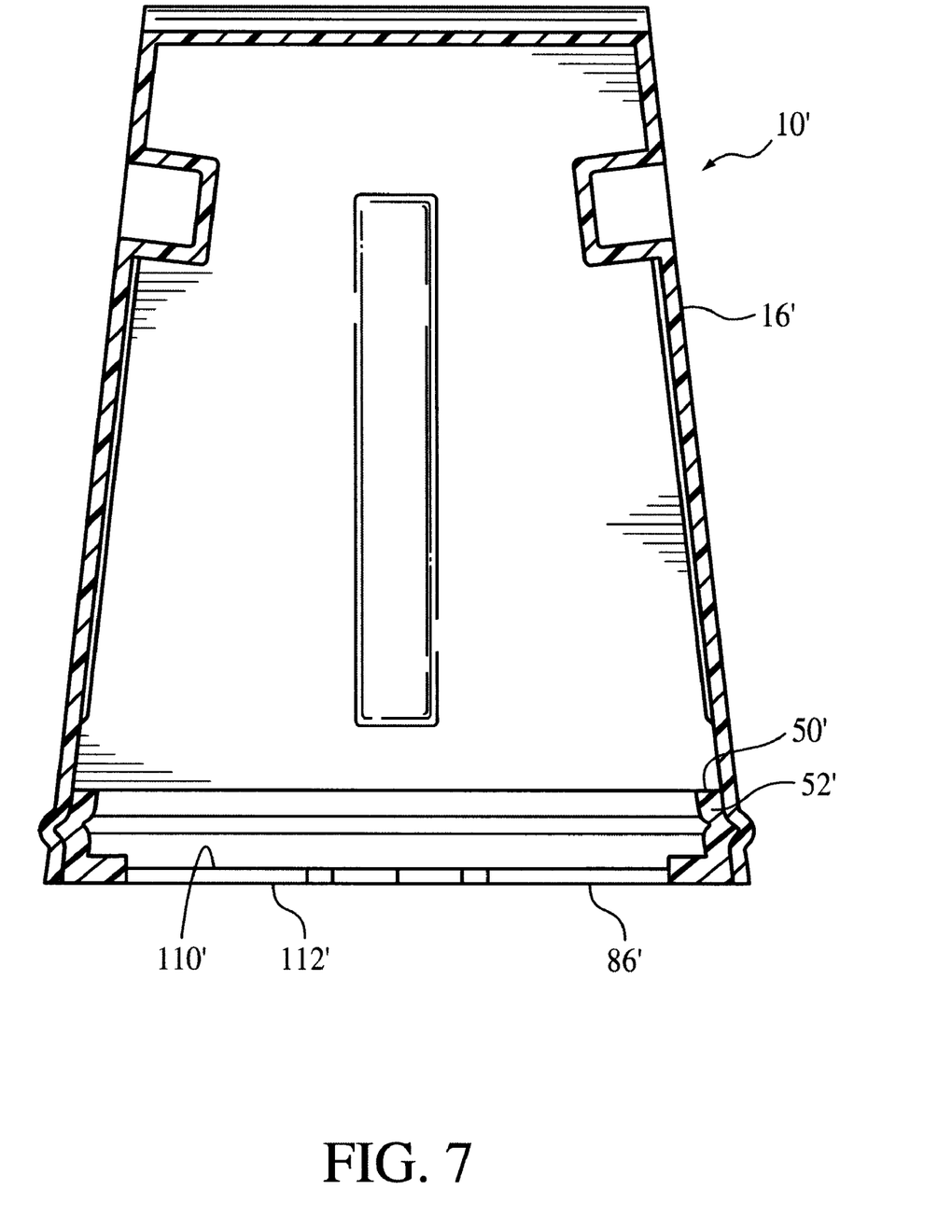
FIG. 7 is a sectional view of a second embodiment of the hydrant cover of the present invention.

Another embodiment of the cover of the present invention is shown in FIG. 7. For ease of description, the cover 10' is numbered with the numerals the same as used in connection with the cover 10 to denote common parts where appropriate and followed by a prime (') mark to denote the cover 10'.

The cover 10' has an upper cover portion 16' and a cover securing portion 50'. The cover securing portion 50' is attached to it assembled with the upper cover portion 16' is described hereinabove in connection with the cover 10. The cover securing portion 50' has an outer peripheral portion 52' and lower flexible securing tabs 86'. Can be seen the cover securing portion 50' does not have any upper flexible securing tabs. The lower flexible securing tabs 86' have upper and lower surfaces 110', 112' defining the thickness of the lower flexible securing tabs 86'. The thickness of the tabs 86' is determined by the type of material, and amount of feature required, and the amount of force required to maintain the cover 10' in a covered positioned over the fire hydrant.

The invention has been described with reference to the embodiments herein. Obviously, modifications and alterations will occur to others upon reading and understanding the specification. It is our intention to include all modifications and alterations in so far as they are within the scope of the appended claims or equivalents thereof.

Having described my invention, I claim:

1. A cover removably attachable over a fire hydrant or the like, which fire hydrant has a base with an outer perimeter of a predetermined distance adjacent the ground and a connector portion extending from the base of the fire hydrant, said cover comprising:

an upper cover portion having a bottom portion, said bottom portion terminating in a bottom perimeter, said upper cover portion formed to enclose the fire hydrant when positioned over the fire hydrant with said bottom perimeter adjacent the ground, and a cover securing portion adapted to be removably attachable to the fire hydrant, said cover securing portion having a plurality of flexible securing tabs, said securing tabs extending inwardly of said bottom portion of said upper cover portion to a tab securing surface adapted to contact the fire hydrant when said cover is positioned over the fire hydrant with said bottom perimeter adjacent the ground.

2. A cover removably attachable over a fire hydrant as described in claim 1 wherein said cover securing portion has an aperture defined by said tab securing surfaces of said flexible securing tabs.

3. A cover removably attachable over a fire hydrant as described in claim 2 wherein said aperture has a circumferential distance less than the predetermined distance of the outer perimeter of the base of the fire hydrant.

4. A cover removably attachable over a fire hydrant as described in claim 1 in which said flexible securing tabs include a plurality of upper flexible securing tabs and a plurality of lower flexible securing tabs, said upper securing tabs spaced from said lower securing tabs.

5. A cover removably attachable over a fire hydrant as described in claim 1 in which each of said flexible securing tabs have base portions that are substantially equal in length and the distance between said base portion and said tab securing surface of each of said tabs is substantially equal.

6. A cover removably attachable over a fire hydrant as described in claim 1 in which said upper cover portion and said cover securing portion are attachable and detachable from each other, said cover securing portion having an outer peripheral portion adjacent said bottom portion, said securing tabs extending inwardly from said outer peripheral portion of said cover securing portion, and said cover having an attachment device for attaching said upper cover portion to said cover securing portion.

7. A cover removably attachable over a fire hydrant as described in claim 1 in which said cover has at least one handle.

8. A cover removably attachable over a fire hydrant as described in claim 7 in which said one handle is formed by a cavity in said upper cover portion.

9. A cover removably attachable over a fire hydrant as described in claim 1 in which said cover has at least one reflector material recess therein and a reflector material mounted in said one reflector material recess.

10. A cover for covering an article extending from a ground surface which article has a base with an outer perimeter of a predetermined distance adjacent the ground, said cover removably attachable to the article, said cover comprising:

an upper cover portion having an bottom portion, said bottom portion terminating in a bottom perimeter, said upper cover portion formed to enclose the article when positioned over the article with said bottom perimeter adjacent the ground surface, and a cover securing portion adapted to be removably attachable to the article, said cover securing portion having a plurality of flexible securing tabs, said securing tabs extending inwardly of said bottom portion of said upper cover portion to a tab securing surface adapted to contact the article when said cover is positioned over the article with said bottom perimeter adjacent the ground surface.

11. A cover for covering an article as described in claim 10 wherein said cover securing portion has an aperture defined by said tab securing surfaces of said flexible securing tabs.

12. A cover for covering an article as described in claim 11 wherein said aperture has a circumferential distance less than the predetermined distance of the outer perimeter of the base of the article.

13. A cover for covering an article as described in claim 10 in which said flexible securing tabs include a plurality of upper flexible securing tabs and a plurality of lower flexible securing tabs, said upper securing tabs spaced from said lower securing tabs.

14. A cover for covering an article as described in claim 10 in which each of said flexible securing tabs have base portions that are substantially equal in length and the distance between said base portion and said tab securing surface of each of said tabs is substantially equal.

15. A cover for covering an article as described in claim 10 in which said upper cover portion and said cover securing portion are attachable and detachable from each other, said cover securing portion having an outer peripheral portion adjacent said bottom portion, said securing tabs extending inwardly from said outer peripheral portion of said cover securing portion, and said cover having an attachment device for attaching said upper cover portion to said cover securing portion.

16. A cover for covering an article as described in claim 10 in which said cover has at least one handle.

17. A cover removably attachable over a fire hydrant as described in claim 16 in which said one handle is formed by a cavity in said upper cover portion.

18. A cover removably attachable over a fire hydrant as described in claim 10 in which said cover has at least one reflector material recess therein and a reflector material mounted in said one reflector material recess.

19. A method of placing a cover for covering an article extending from a ground surface, the method comprising the steps of:

providing an upper cover portion having an bottom portion, said bottom portion terminating in a bottom perimeter, said upper cover portion formed to enclose the article when positioned over the article with said bottom perimeter adjacent the ground surface, providing a cover securing portion adapted to be removably attachable to the article, said cover securing portion having a plurality of flexible securing tabs, said securing tabs extending inwardly of said bottom portion of said upper cover portion to a tab securing surface adapted to contact the article when said cover is positioned over the article with said bottom perimeter adjacent the ground surface, and attaching said cover securing portion to said upper cover portion.

20. A method of placing a cover for covering an article extending from a ground surface as described in claim 19 which the step of attaching said cover securing portion to said upper cover portion includes the step of orienting the sides of said cover securing portion adjacent said bottom perimeter of said upper cover portion.

21. A method of placing a cover for covering an article extending from a ground surface as described in claim 19 which the step of attaching said cover securing portion to said upper cover portion includes the step of moving said upper cover portion toward said upper cover portion.

22. A method of placing a cover for covering an article extending from a ground surface as described in claim 19 which the step of attaching said cover securing portion to said upper cover portion includes the step of positioning a protrusion in one of said upper cover portion and said cover securing portion in a depression in the other of said upper cover portion and said cover securing portion.

23. A method of securing a cover over a fire hydrant extending from a ground surface, the method comprising the steps of:

providing a cover having an upper cover portion having an bottom portion, said bottom portion terminating in a bottom perimeter, said upper cover portion formed to enclose the fire hydrant when positioned over the fire hydrant with said bottom perimeter adjacent the ground, and a cover securing portion adapted to be removably attachable to the fire hydrant, said cover securing portion having a plurality of flexible securing tabs, said securing tabs extending inwardly of said bottom portion of said cover securing portion to a tab securing surface adapted to contact the fire hydrant when said cover is positioned over the fire hydrant with said bottom perimeter adjacent the ground, positioning said cover above the fire hydrant with said tabs positioned above the top of the fire hydrant, lowering said cover and moving said tabs of said cover along the fire hydrant until said bottom perimeter is adjacent the ground surface with said tab securing surfaces in contact with the fire hydrant.

\* \* \* \* \*